Aug. 16, 1966 M. J. NEUMEYER 3,266,588
VEHICLE STEERING SYSTEM
Filed Feb. 14, 1964 2 Sheets-Sheet 1
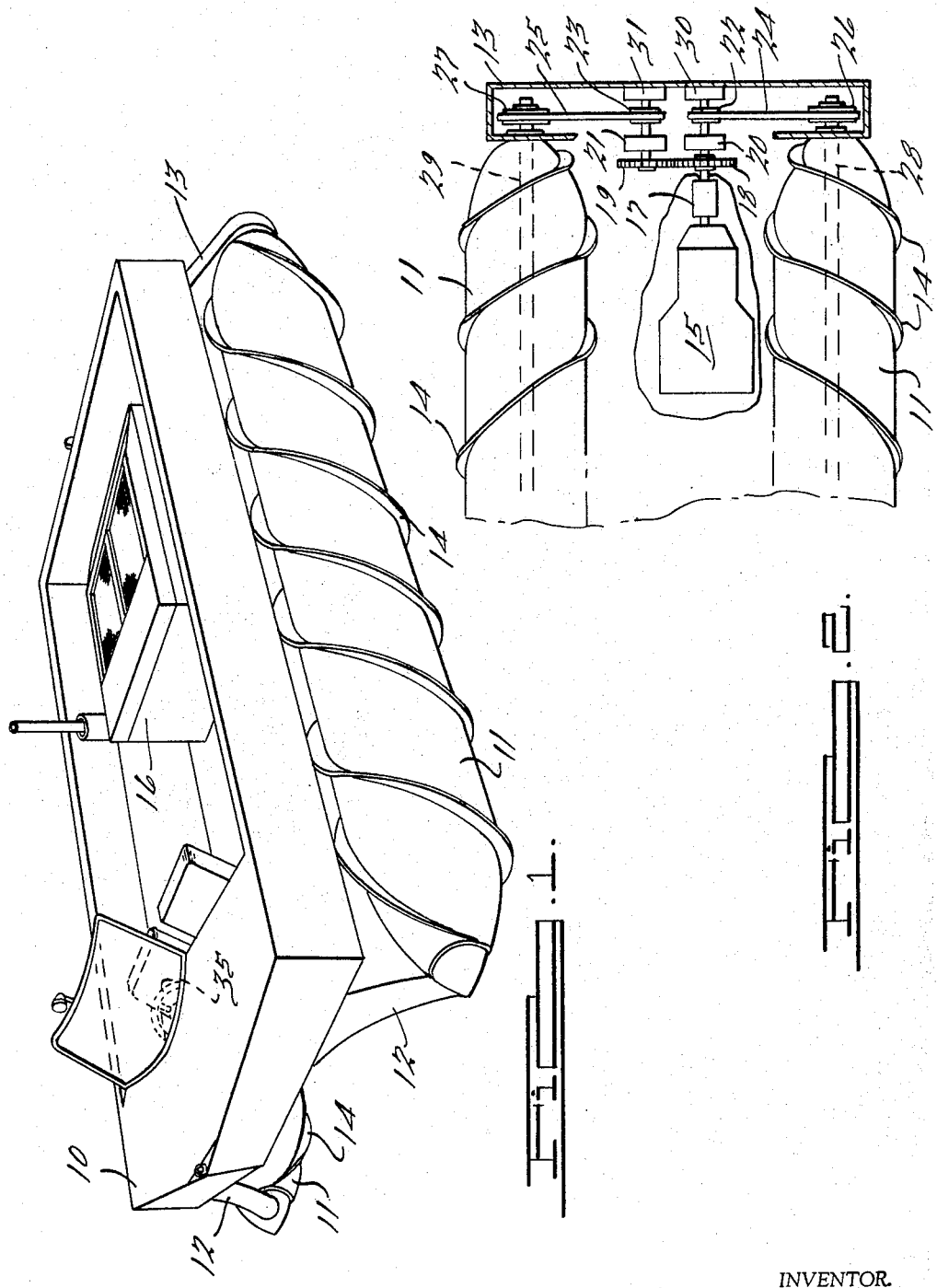
INVENTOR.
Martin J. Neumeyer.
BY
Harness & Harris
ATTORNEYS

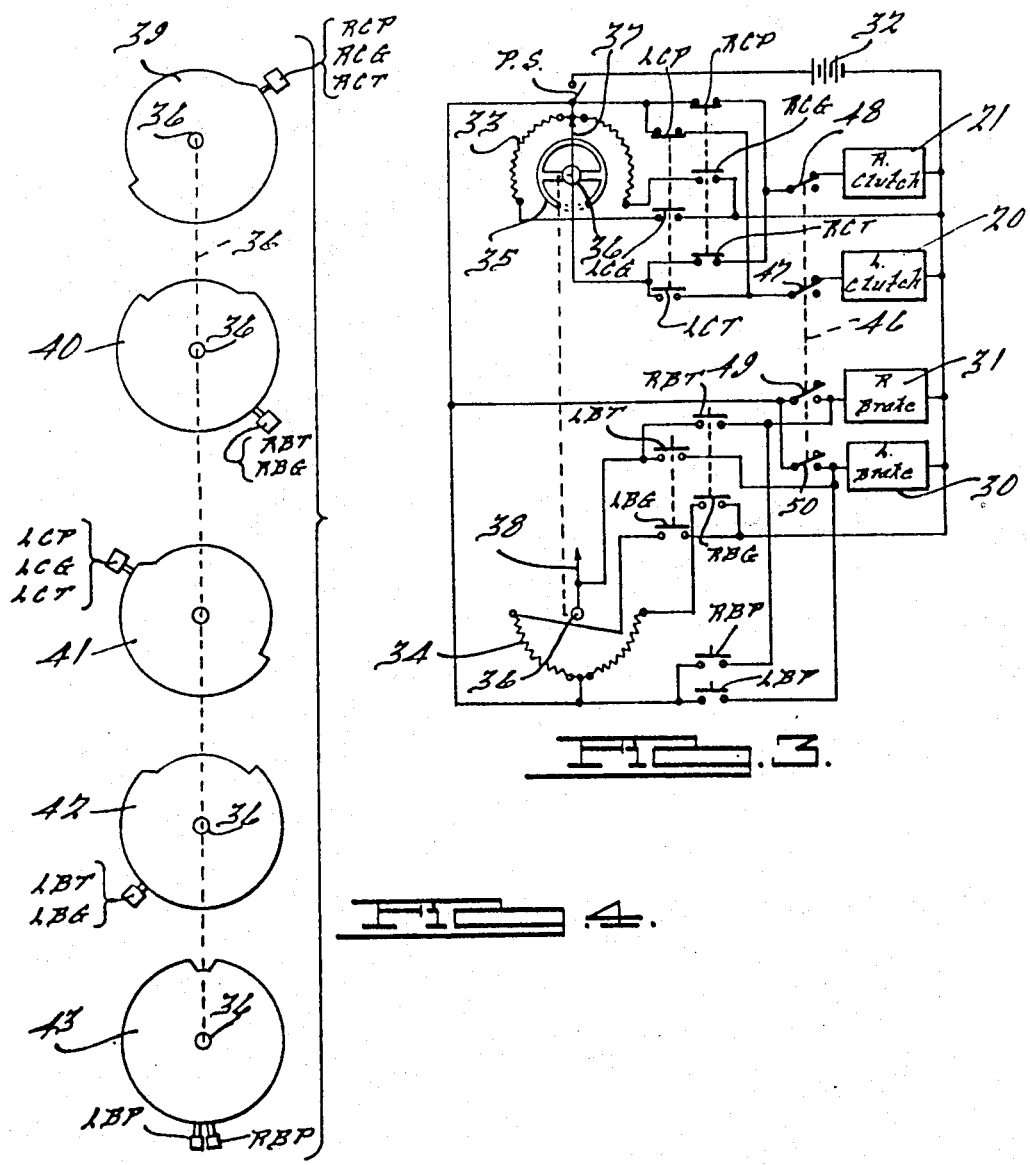

United States Patent Office 3,266,588
Patented August 16, 1966

3,266,588
VEHICLE STEERING SYSTEM
Martin J. Neumeyer, Utica, Mich., assignor to Chrysler Corporation, Highland Park, Mich., a corporation of Delaware
Filed Feb. 14, 1964, Ser. No. 344,969
5 Claims. (Cl. 180—6.2)

This invention relates to improvements in a steering device for an amphibious-type vehicle adapted to travel over water, marsh-land, snow, and the like, as well as over ordinary cross country terrain.

A common type of such a vehicle comprises a body supported on a pair of laterally disposed cylindrical pontoons extending generally longitudinally of the vehicle and rotatable about their respective axes. A helical blade is wound spirally around and secured to each pontoon and is adapted to embed into the terrain or supporting medium and to move therethrough by screw action upon rotation of the pontoons. Preferably the blades have oppositely directed screw leads and are rotated in opposite directions at the same speed in order to propel the vehicle in a straight line. Steering is accomplished by varying the speed of rotation of one or the other of the pontoons.

By virtue of the screw drive effected by the spiral blades embedding into the terrain, an appreciably different ground engaging and steering action is experienced, as compared to the usual wheeled or tread-type vehicle which depends upon a high degree of frictional engagement with the ground for its drive. At the outset, the elongated helical blades embedded into the terrain tend to resist steering movement and render steering control difficult. Also in the screw type vehicle wherein the forward drive is effected by the cam or inclined plane action of the rotating screw, frictional engagement with the terrain or supporting medium, while not entirely avoidable, is desirable at a minimum. Any change in power to one pontoon tending to vary its speed of rotation will tend to cause a similar change in rotation speed of the other pontoon.

An important object of the present invention has been to provide an improved drive and steering control for an amphibious vehicle of the above character, wherein steering is achieved by a combination of variable clutching and braking operations on one or the other of the pontoons, depending on the direction of the turn.

Another and more specific object of the present invention is to provide such a steering control combining a variable clutch engagement between each pontoon and its driving power with a separate variable brake for each pontoon. Steering in one direction is progressively accelerated by gradually disengaging the clutch connection between one pontoon and its driving power. Thereafter, when the one pontoon has been substantially de-clutched from its driving power, it is gradually braked by a progressively increasing braking force. By suitably maintaining the driving power to the other pontoon, the vehicle will be steered in the direction toward the de-energized or decelerated pontoon.

By virtue of such a steering operation, a moderate steering or turning effect can be accomplished by de-clutching or de-powering one of the pontoons. During this operation, the de-powered pontoon will continue to rotate by reason of its screw-type engagement with the terrain and the vehicle will experience a slight sideways movement in the direction toward the de-clutched pontoon, depending upon the terrain, as well as a steering movement in the direction toward the de-clutched pontoon. Thereafter a more rapid turning effect can be accomplished by braking the de-powered pontoon, whereupon the aforesaid screw engagement between the braked pontoon and the terrain will cause the vehicle to turn more rapidly in the direction toward the braked pontoon.

Other objects of this invention will appear in the following description and appended claims, reference being had to the accompanying drawings forming a part of this specification wherein like reference characters designate corresponding parts in the several views.

FIGURE 1 is a perspective view of an amphibious vehicle embodying the present invention.

FIGURE 2 is a plan elevational view, partly in section, schematically illustrating the power train between the vehicle engine and its pontoons.

FIGURE 3 is a schematic electrical circuit of the steering mechanism.

FIGURE 4 is a schematic view of the cam actuated switch control means for the circuit of FIGURE 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in an amphibious vehicle having a body or passenger compartment 10 supported on a pair of elongated laterally disposed pontoons 11 by fore and aft supports 12 and 13. The pontoons 11 may be conventional and are preferably hollow and generally cylindrical shells filled with a buoyant water impervious plastic foam adapted to support the outer shell and to prevent the same from being filled with water in the event it is punctured. Wound helically around each pontoon and secured thereto are two blades 14 effective to embed into the terrain or supporting medium and to propel the vehicle by a screw action.

The body 10 carries a suitable engine and power transmission unit 15, which may be conventional, and is confined within a housing 16 open to the atmosphere. The power output shaft of the engine 15 is connected by means of a coupling 17 with the driving shaft of a gear 18 meshed with a similar gear 19. The shafts of gears 18 and 19 are connected by conventional electrically operated variable friction clutches 20 and 21 respectively with the drive shafts of a corresponding pair of sprockets 22 and 23. The latter are also coupled by means of sprocket chains 24 and 25 with driven sprockets 26 and 27 respectively keyed to the axial shafts 28 and 29 respectively of the left and right pontoons 11. The shafts 28 and 29 extend axially of their respective pontoons 11 and are suitably secured thereto adjacent their opposite ends so as to rotate the pontoons in opposite directions upon engine driven operation of the gear 18. When the clutches 20 and 21 are energized, power from the engine 15 is transmitted directly from gears 18 and 19 to the sprockets 22 and 23 to rotate the same. By virtue of the arrangement of the gears 18 and 19, the sprockets 22 and 23 will be rotated in opposite directions.

A pair of electrically controlled variable brakes 30 and 31 carried by the support 13 are selectively engageable as described below with the shafts of sprockets 22 and 23 to brake the latter. The drive train comprising the engine 15, coupling 17, gears 18, 19, clutches 20, 21, and sprockets 22, 23, 26, 27, as well as the brakes 30, 31, may be conventional and are accordingly not described in further detail. Examples of clutches and brakes suitable for use with the present invention are described in Patent No. 2,695,675, Frye, and in Bendix Corporation publications relating to the model EKE clutch and the model EFL brake.

Selective control over the variable clutches 20, 21 and variable brakes 30, 31 is accomplished by means of an electrical circuit, FIGURE 3, including a power source 32, a clutch rheostat 33 and a brake rheostat 34. A manually operable steering wheel 35 rotates a steering shaft 36 suitably mounted in the body 10. An electrical clutch contactor 37 and brake contactor 38 comprising the movable elements of the rheostats 33 and 34 respectively are carried by the shaft 36 and are suitably insulated therefrom. The contactors are operable in unison to vary the energy to the left or right clutch 20, 21 and left or right brake 30, 31 in accordance with turning of the wheel 35.

An assembly of cam actuated switches included in the electrical circuit of FIGURE 3 is operable in accordance with the turning of wheel 35 and shaft 36 so as to de-energize both brakes 30 and 31 and to fully energize both clutches 20 and 21 when the steering wheel is in a neutral condition for steering straight ahead. The neutral condition preferably allows a slight extent of lost motion in the steering wheel, as for example 10 degrees in either direction. Thereafter, upon turning of the steering wheel to the left or right from the neutral position throughout a range of clutch energizing positions, the left or right clutch respectively will be progressively de-energized and the power transmitted through the de-energized clutch to the corresponding sprocket 22 or 23 and left or right pontoon 11 will be progressively decreased. Steering in the direction toward the de-energized pontoon will result and the steering action will accelerate as the energy transmitted to the de-energized pontoon decreases. During this steering action, the de-energized pontoon will free wheel and the steering action, particularly over comparatively hard terrain, will be more or less sideways. Over hard smooth terrain, such as a roadway, the movement will be entirely sideways when only one pontoon is power rotated and the other is completely de-clutched from the power.

Over comparatively soft terrain, after one or the other of the pontoons has been substantially de-clutched or disconnected from the driving power, the steering movement is accelerated by progressively energizing the corresponding brake 30 or 31 so as to apply progressively increasing braking force to the de-clutched pontoon. The greater the braking force, the greater will be the turning action in the direction toward the braked pontoon.

Details of a particular steering control means are illustrated schematically in FIGURES 3 and 4 wherein the energy from power source 32 is supplied through a main power switch PS. When the latter switch is closed, both clutches 20 and 21 may be de-energized, so as to transmit no power from engine 15 to either pontoon 11, by shifting gang switch 46 to its downward position in FIGURE 3. Thus switches 47 and 48 in the circuit for clutches 20 and 21 respectively will be opened. Simultaneously switches 49 and 50 will be closed to connect the power 32 through both brakes 30 and 31 to energize the same and lock both pontoons 11 against rotation.

By shifting gang switch 46 to its upward position in FIGURE 3 when master switch PS is closed and steering wheel 35 is in its neutral position, both brakes 30 and 31 will be de-energized and clutches 20 and 21 will be energized through normally closed limit switches RCP and LCP respectively. Thus the steering mechanism will be in the condition for straight-ahead steering. Both brakes 30 and 31 will be de-energized or released and both clutches 20 and 21 will be fully energized or engaged to supply the engine power from the coupling 17 to both sprockets 22 and 23 and thus to sprockets 26 and 27 and the left and right pontoons 11 as described above.

Upon rotation of the steering wheel 35 clockwise throughout the limited range of a neutral condition, clutch contactor 37 will engage the right hand portion of clutch rheostat 33. At this position the movable contactor for limit switches RCP, RCG, and RCT will move sufficiently off the high point of cam 39 to cause limit switch RCP to open and limit switches RCG and RCT to close. Power from source 32 will then be conducted through master switch PS to the right half of rheostat resistor 33 and thence to ground through switch RCG. Depending upon the position of clutch contactor 37, a portion of the electrical potential across the right resistor of rheostat 33 will be applied across switches RCT and 48 and the right clutch 21 to ground. As steering wheel 35 is rotated progressively clockwise, contactor 37 will similarly move clockwise along the right resistor of rheostat 33 and gradually de-energize the right clutch 21 so as to progressively de-energize the right pontoon 11. During this operation the left clutch 20 will be fully energized through switches PS, LCP and 47. Also during the first portion of this steering movement (until the steering wheel 35 has been rotated approximately 90 degrees from the neutral condition shown) neither brake 30 nor 31 will be energized.

After steering wheel 35 has been rotated clockwise approximately 90 degrees, the brake contactor 38 will engage the right resistor of rheostat 34. Simultaneously the movable elements of limit switches RBT and RBG will ride off the high edge of cam 40, causing these limit switches to close in FIGURE 3 and connect the power source 32 through the right resistor of rheostat 34 to ground. Likewise, depending upon the position of brake contactor 38, a portion of the potential across the right resistor of rheostat 34 will be applied across switch RBT and right brake 31. The more the contactor 38 moves clockwise along the right resistor of rheostat 34, the more will brake 31 be energized, the greater will be its braking action on the right pontoon 11, and the more effective will be the right turn.

Eventually contactor 37 will move clockwise off the right resistor of rheostat 33, whereupon the right clutch will be completely de-energized. After slightly less than 180 degrees of clockwise rotation of steering wheel 35, contactor 38 will arrive at the clockwise extremity of the right resistor of rheostat 34. Simultaneously the movable element of limit switch RBP will ride off the high portion of cam 43, causing limit switch RBP to close and connect the power source 32 through the right brake 31 and effect the maximum right hand turning action.

The left turn steering control is similar. Upon counterclockwise rotation of steering wheel 35 through the limited neutral position, contactor 37 will engage the left resistor of rheostat 33. Simultaneously the movable element of limit switches LCP, LCG, and LCT will ride off the high edge of cam 41, causing limit switch LCP to open and limit switches LCG and LCT to close. The power source 32 will then be connected through master switch PS and across the left resistor of rheostat 33 to ground through switch LCG. Also, depending upon the counterclockwise position of contactor 37, a portion of the potential across the left resistor of rheostat 33 will be applied across switches LCT and 47 and the left clutch 20. As counterclockwise movement of steering wheel 35 moves contactor 37 progressively along the left resistor of rheostat 33, the left clutch 20 will be progressively de-energized. After approximately 90 degrees of counterclockwise rotation of steering wheel 35, brake contactor 38 will engage the left-hand resistor of rheostat 34. Also the movable actuator for limit switches LBT and LBG will move off the high edge of cam 42 to close limit switches LBT and LBG, thereby to connect the power source 32 through the left resistor of rheostat 34 to ground through limit switch LBG and to apply a portion of the potential across the latter resistor across contactor 38, switch LBT and the left brake 30.

Upon continued counterclockwise rotation of steering wheel 35, contactor 37 will eventually ride off the end of rheostat 33 and contactor 38 will continue to ride counterclockwise along the left resistor of rheostat 34 so as to progressively increase the electrical energy to brake 30 and thereby to progressively increase the braking action on the left pontoon 11. Finally after slightly less than 180 degrees of counterclockwise rotation of steering wheel 35, the movable contactor for limit switch LBP will move off of the high edge of cam 43 to close limit switch LBP and direct the energy of source 32 through the left brake 30 and cause the maximum leftward steering action.

Obviously in regard to the foregoing, the circular cams 39 through 43 of FIGURE 4 are keyed to shaft 36 to rotate in unison therewith.

I claim:

1. In a vehicle, means for propelling said vehicle comprising separate operable ground engaging means at the opposite sides of said vehicle and adapted to be operated independently of each other at different relative speeds to steer said vehicle, a separate power train associated with each ground engaging means to operate the same, the power train associated with one of said ground engaging means including driven means adapted to be coupled with a source of power to be driven thereby, driving means operatively connected with said one ground engaging means to operate the latter, and clutch means for interconnecting said driven and driving means to drive the latter from the former and adapted to be progressively energized or de-energized to progressively increase or decrease the power transmitted to said driving means from said driven means, brake means associated with said one ground engaging means to brake the same and adapted to be progressively energized or de-energized to progressively increase or decrease the braking force applied to said one ground engaging means, operable power control means for selectively controlling the energy to said clutch and brake means and being coupled with said clutch means to energize the same upon being shifted to a neutral condition and to progressively de-energize said clutch means upon being shifted in one direction from said neutral condition, throughout a predetermined first range of positions said power control means being coupled with said brake means to (a) de-energize the same upon being shifted to said neutral condition and throughout a predetermined second range of positions in said one direction from said neutral condition and (b) progressively energize said brake means upon being shifted in said one direction throughout a third range of positions immediately beyond said second range, said second range of positions being of lesser extent than said first range of positions, such that said third range of positions partially overlaps said first range of positions.

2. In an electrical circuit for vehicle steering, a source of electrical energy, first and second electrically actuated clutch means, first and second electrically actuated brake means, variable rheostat means having contact means movable in first and second directions from a neutral position, switch means cooperable with said source of energy, rheostat means, and clutch means for (a) connecting said source of energy with said first and second clutch means to supply maximum energy thereto when said contact means is at said neutral position and (b) connecting said source of energy with said second clutch means to supply maximum energy thereto and for connecting said first clutch means through said rheostat means to progressively decrease the energy thereto upon movement of said contact means in said first direction from said neutral position, said switch means being also cooperable with said source of energy, rheostat means, and brake means for (a) maintaining an open circuit between said source of energy and said first and second brake means when said contact means is at said neutral position and upon movement of said contact means throughout a predetermined range of positions in either said first or second direction from said neutral position and (b) maintaining an open circuit between said source of energy and said second brake means and for connecting said first brake means to said source of energy through said rheostat means to progressively increase the energy thereto upon movement of said contact means in said first direction beyond said range of positions.

3. In an electrical circuit for vehicle steering, a source of electrical energy, electrically actuated clutch means, electrically actuated brake means, variable rheostat means having contact means movable in one direction from a neutral position, switch means cooperable with said source of energy, rheostat means, and clutch means for connecting said source of energy with said clutch means to supply maximum energy thereto when said contact means is at said neutral condition, and for connecting said clutch means through said rheostat means to progressively decrease the energy thereto upon movement of said contact means in said direction throughout a first range of positions from said neutral condition, said switch means being also cooperable with said source of energy, rheostat means, and brake means for maintaining an open circuit between said source of energy and said brake means when said contact means is at said neutral position and upon movement of said contact means through a second predetermined range of positions in said one direction from said neutral position, and for connecting said brake means to said source of energy through said rheostat means to progressively increase the energy thereto upon movement of said contact means in said one direction beyond said second range of positions, said first range of positions overlapping a portion of said second range of positions.

4. In a vehicle, means for propelling said vehicle comprising first and second operable ground engaging means at the opposite sides of said vehicle and adapted to be operated independently of each other at different relative speeds to steer said vehicle, first and second power trains associated with said first and second ground engaging means respectively to operate the same, each power train including a first power driven means and a second driven means, said second driven means being operatively coupled with the associated ground engaging means to drive the latter, a source of electrical energy, first and second electrically actuated clutch means associated with said first and second power trains respectively for interconnecting the associated power driven and second driven means to drive the latter from the former, first and second electrically actuated brake means for braking said first and second ground engaging means respectively, variable rheostat means having contact means movable in first and second directions from a neutral condition, switch means cooperable with said source of energy, rheostat means, and clutch means for (a) connecting said source of energy with said first and second clutch means to supply maximum energy thereto when said contact means is at said neutral condition and (b) connecting said source of energy with said second clutch means to supply maximum energy thereto and for connecting said first clutch means through said rheostat means to progressively decrease the energy thereto upon movement of said contact means in said first direction from said neutral condition, said switch means being also cooperable with said source of energy, rheostat means, and brake means for (a) maintaining an open circuit between said source of energy and said first and second brake means when said contact means is at said neutral condition and upon movement of said contact means throughout a predetermined range of positions in either said first or second direction from said neutral condition and (b) maintaining an open circuit between said second brake means and said source of energy and for connecting said first brake means to said source of energy through said rheostat means to progressively increase the energy thereto upon movement of said contact means in said first direction beyond said range of positions.

5. In a vehicle, means for propelling said vehicle comprising separate operable ground engaging means at the opposite sides of said vehicle and adapted to be operated independently of each other at different relative speeds to steer said vehicle, separate power trains associated with said separate ground engaging means respectively to operate the same, the power train associated with one of said ground engaging means including a first power driven means and a second driven means, said second driven means being operatively coupled with said one ground engaging means to drive the latter, a source of electrical energy, electrically actuated clutch means for interconnecting said power driven and second driven means to drive the latter from the former, electrically actuated brake means for braking said one ground engaging means, variable rheostat means having contact means movable in one direction for a neutral position, switch means cooperable with said source of energy, rheostat means, and clutch means for connecting said source of energy with said clutch means to supply maximum energy thereto when said contact means is at said neutral condition and for connecting said clutch means through said rheostat means to progressively decrease the energy thereto upon movement of said contact means in said direction throughout a first range of positions from said neutral condition, said switch means being also cooperable with said source of energy, rheostat means, and brake means for maintaining an open circuit between said source of energy and said brake means when said contact means is at said neutral position and upon movement of said contact means through a second predetermined range of positions in said one direction from said neutral position, and for connecting said brake means to said source of energy through said rheostat means to progressively increase the energy thereto upon movement of said contact means in said one direction beyond said second range of positions, said first range of positions overlapping said second range of positions.

References Cited by the Examiner

UNITED STATES PATENTS

| | | | |
|---|---|---|---|
| 907,462 | 12/1908 | Coleman. | |
| 1,646,611 | 10/1927 | Code | 115—1 |
| 2,352,593 | 7/1944 | Allin | 180—6.2 |
| 2,669,330 | 2/1954 | Banker | 180—6.2 X |
| 2,695,675 | 11/1954 | Frye | 180—6.28 |
| 2,757,373 | 7/1956 | Marrie | 180—6.2 |
| 2,883,019 | 4/1959 | Kershner et al. | 192—13 |
| 2,885,043 | 5/1959 | Martinson | 192—13 |
| 3,017,941 | 1/1962 | Baker | 180—6.2 |
| 3,030,903 | 4/1962 | Charles | 115—1 |

FOREIGN PATENTS

| | | |
|---|---|---|
| 708,079 | 5/1954 | Great Britain. |

BENJAMIN HERSH, *Primary Examiner.*

J. A. PEKAR, *Assistant Examiner.*